United States Patent [19]
Yoshino et al.

[11] Patent Number: 5,012,353
[45] Date of Patent: Apr. 30, 1991

[54] APPARATUS FOR READING ORIGINAL

[75] Inventors: Eiji Yoshino, Odawara; Yasumasa Matsuda, Tokyo; Takahiro Yamada, Yokohama, all of Japan

[73] Assignee: Hitachi, Ltd., Tokyo, Japan

[21] Appl. No.: 201,869

[22] Filed: Jun. 3, 1988

[30] Foreign Application Priority Data

Jun. 4, 1987 [JP] Japan ............................... 62-140343
Jul. 8, 1987 [JP] Japan ............................... 62-168680
Nov. 30, 1987 [JP] Japan ............................... 62-300228

[51] Int. Cl.$^5$ ........................................... H04N 1/04
[52] U.S. Cl. .................................... 358/401; 358/474
[58] Field of Search ............... 358/296, 293, 290, 256, 358/288, 285, 400, 401, 405, 408, 443, 474, 448, 488, 497; 355/234, 128, 129, 130, 131

[56] References Cited

U.S. PATENT DOCUMENTS

| 1,217,005 | 2/1917 | Johnson | 355/131 |
| 4,245,259 | 1/1981 | Pick | 358/293 |
| 4,486,786 | 12/1984 | Sato | 358/285 |
| 4,538,183 | 8/1985 | Kanno | 358/280 |
| 4,617,596 | 10/1986 | Yoshida | 358/280 |
| 4,667,248 | 5/1987 | Kanno | 358/280 |
| 4,684,998 | 8/1987 | Tanioka | 358/293 |
| 4,684,999 | 8/1987 | Sakakibara | 358/256 |
| 4,700,238 | 10/1987 | Sujiyama | 358/296 |
| 4,771,336 | 9/1988 | Ohtorii | 358/293 |
| 4,816,921 | 3/1989 | Akiyama | 358/285 |

FOREIGN PATENT DOCUMENTS

| 55-157761 | 12/1980 | Japan . |
| 55-157763 | 12/1980 | Japan . |
| 55-157764 | 12/1980 | Japan . |
| 59-40758 | 3/1984 | Japan . |
| 59-41963 | 3/1984 | Japan . |
| 60-213168 | 10/1985 | Japan . |
| 62-29261 | 2/1987 | Japan . |
| 62-239660 | 10/1987 | Japan . |
| 2173665 | 10/1986 | United Kingdom . |

Primary Examiner—Edward L. Coles, Sr.
Assistant Examiner—Jerome Grant
Attorney, Agent, or Firm—Antonelli, Terry, Stout & Kraus

[57] ABSTRACT

An original reading apparatus reads out an original which is laid with its surface to be read being directed upward, to thereby convert the read information into an image information. The original reading apparatus has a digitizer function so that a partial reading region of the original is assigned and read out after operator's confirmation by direct observation from an upper side of the surface to be read of the original. A transparent plate on which is depicted reference coordinates for showing a readable region of the apparatus is provided in the vicinity of the original, and a position of the original is finely adjusted on the basis of the reference coordinates. A reading sensor and a carriage mechanism of the original reading apparatus are received in a rotatable upper cover of the apparatus. In case of a large size original, the information thereof is read without any fold or cut of the original.

7 Claims, 3 Drawing Sheets

FIG. 1
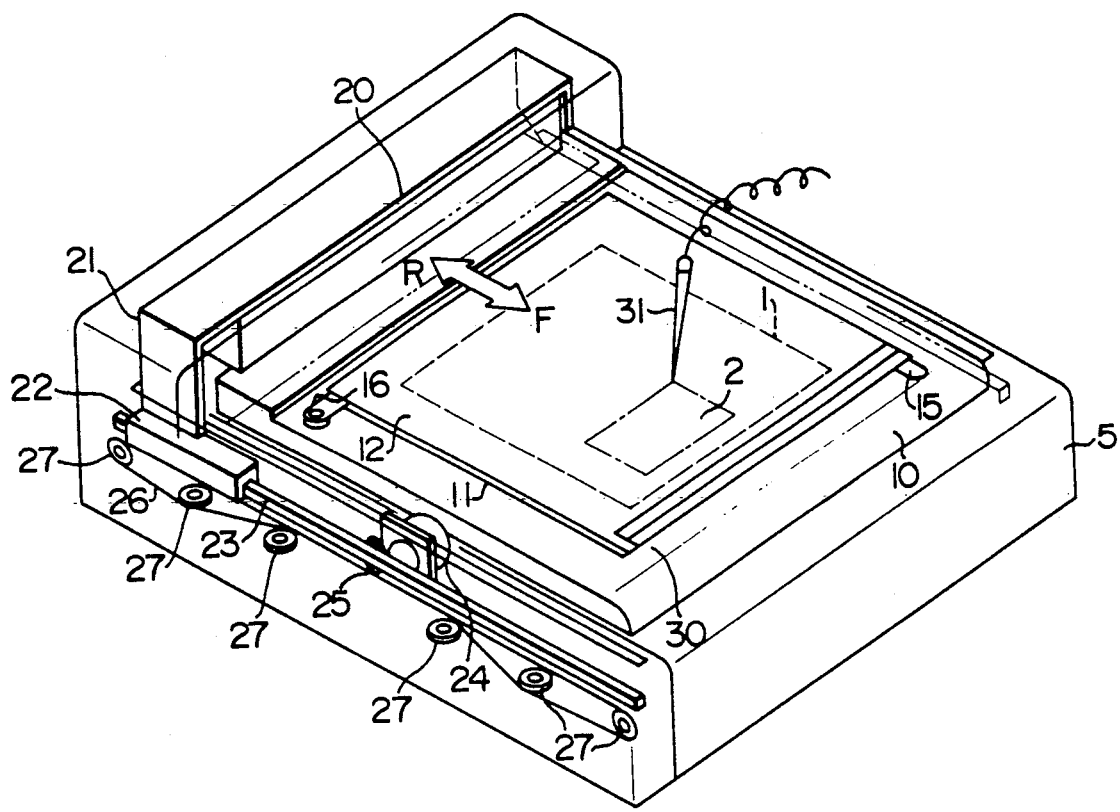
FIG. 2a
FIG. 2b
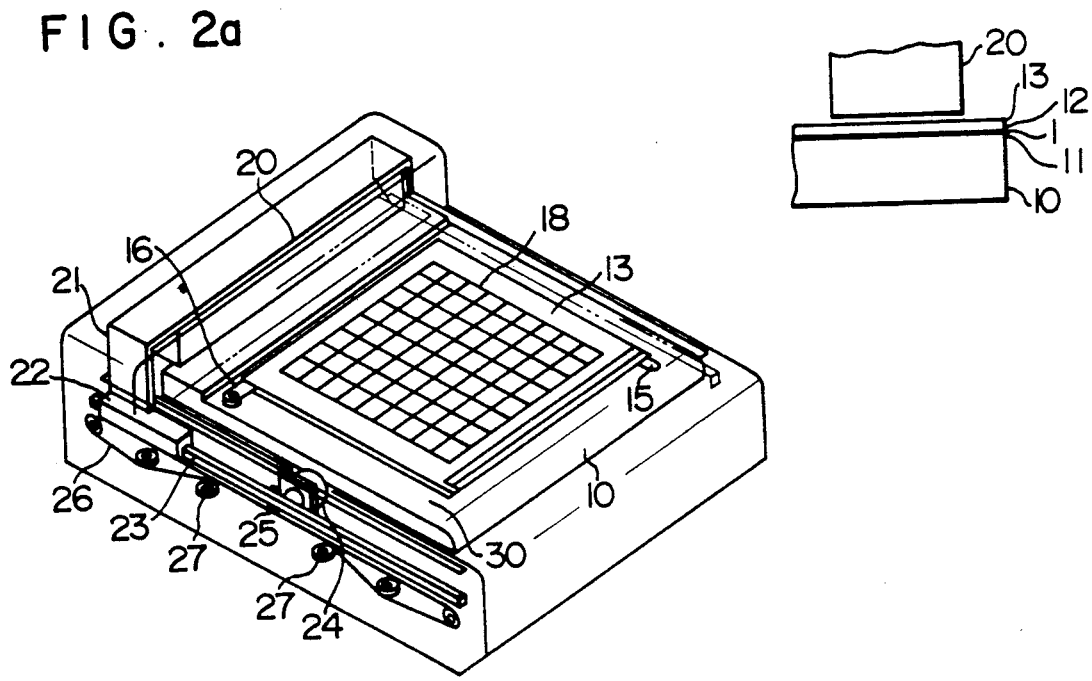

APPARATUS FOR READING ORIGINAL

BACKGROUND OF THE INVENTION

The present invention relates to an apparatus for electro-optically reading an original, and more particularly to an original reading apparatus used for inputting image information into various instruments such as, for example, a digital copying machine, an intelligent facsimile, a personal computer or any other work stations.

Most of the conventional original reading apparatuses of this type are of such a type that an optical system is arranged on the underside of a surface of an original which is to be read out and reads the original from below. For instance in case of a facsimile, an original sheet is delivered over a reading sensor with its surface to be read being directed downward. Also, in case of a copying machine, an original is laid on a transparent original platen with its surface to be read being directed downward, and then a reading scanner is moved to read the original.

On the other hand, for example, Japanese Patent Unexamined Publications Nos. 55-40758 and 59-41963 show original reading apparatuses of the top side reading type in each of which an optical unit is disposed on the upper side of an original. The former publication proposes a reading apparatus in which the original sheet is delivered with its surface to be read being directed upward while being illuminated, and its reflective light is photoelectrically converted by light receiving elements to read its image information. The latter publication is directed to an original reading apparatus in which the original is laid with its surface to be read being directed upward, and is read by a head scanning thereabove. This system is so designed as to exactly read out the information even if the position of the surface of the original to be read is at a high level.

Furthermore, the top side reading systems with a surface of an original to be read being directed upward are shown or disclosed in Japanese Patent Unexamined Publications Nos. 55-157761, 55-157763 and 55-157764.

The recent development of personal computers, engineering work stations and the like has been advanced at a good pace. In these apparatuses, the performance and function for creating figures and images under the control of computers, and for forming documents including the figures and images at random by means of its word processing function have been enhanced. But there is still a limitation for rapidly forming, as desired, the figures or images with these apparatuses. Therefore, there have been increased demands for introducing image information into these apparatuses from the outside.

It is, however, difficult to code the image information unlike the literal information in addition to the fact that the image information have a large amount of information. For this reason, it is necessary to provide a large capacity of memory for processing the image information, which would lead to increased cost and a time-consuming processing, resulting in a deterioration in the operability. Thus, unnecessary image information must be excluded as much as possible. This would lead to simplification of a structure of the overall system to improve the operability. Accordingly, it is very important to read, with an original reading apparatus, only a portion of an original that is truly necessary, in such a manner that a necessary minimum processing work will be carried out after the readout.

In an original reading apparatus of the bottom side reading type, it would be substantially impossible to partially read out an original without effecting any direct work on the original, such as covering the unnecessary parts of the original with a blank paper.

In view of this, Japanese Patent Unexamined Publication No. 60-213168 shows a system for a conventional copying machine of the bottom side reading type. In this system, a number of electrical switches are arranged along adjacent sides of an original platen. When the partial reading of an original is desired, the corresponding switches to opposite ends in a longitudinal direction and opposite ends in a transverse direction of the position to be read are to be depressed, thereby inputting the partially assigned region of the original into the system. Incidentally, in this system, special lamps are provided to illuminate the original from below so as to indicate the image pattern transparently on the opposite surface of the original for configuration of the assigned region. However, as the image to be viewed by the operator is inverted, it would be difficult to confirm the assigned region.

Particularly, in case of an original having information of letters, figures and/or images on both faces thereof, these letters, figures and images would overlap to one another transparently through the original sheet, and thus it would be extremely difficult to confirm the assigned region. Also, since the system is such that the opposite ends both in the longitudinal and transverse directions of the partial region of the original are assigned, there is limited the partially reading to only a rectangular shape or a simple polygonal shape.

In the above-described Japanese Patent Unexamined Publication No. 59-40758, the surface of the original to be read is directed upwardly, so that it is possible to view the contents of the original from above. In this publication, there is a description that the partial readout of the original is possible by setting the original in a state where the original is moved in a midway and then starting the readout operation. However, in such a system, it is unclear whether or not the desired portion of the original exactly corresponds to the light receiving elements. Thus, it is impossible to expect to ensure the satisfactory accuracy.

Furthermore, in the apparatus proposed in the above-described Japanese Patent Publication No. 59-41963, the surface to be read of the original is directed upwardly and it is possible to read an original such as a book having a physical thickness. Therefore, it is possible to change pages of the original under the condition where the original is set in the apparatus. Also, in respect of the partial reading operation, it is easy to perform the works of covering from above, with a piece of blank sheet, an other portion that is unnecessary to read, or of overlapping a plurality of originals for composite readout, as compared with the bottom side reading type apparatus. Nevertheless, also in this case, it is difficult to partially read the original with high accuracy and the manual work for this end is time-consuming.

In addition, in order to read the image information for the necessary minimum processing, it is necessary to lay the original on a reading apparatus with high accuracy. However, in the conventional apparatus, although it is possible to roughly correct the positional offset of the original, there is almost no reference for the exact position of the original. As a result it is difficult to correct or compensate for the positional offset or displacement of the original.

For example, in the case where an edge of the original sheet is aligned with an associated edge of the original platen, it is possible to input the information without any correction if the contents of the original is not slanted or inclined with respect to the original sheet. But, if the contents is inclined the original sheet, it is necessary to incline the original sheet in the reverse direction to compensate the inclination of the contents of the original. In this case, there comes to be no reference. Also, even if the original is not inclined, when the edge of the original sheet is aligned with the platen edge, there is a fear that the part of the original to be inputted would come out of the possible input range of the apparatus.

Thus, there are problems that it is time-consuming and troublesome to read out the original while slightly displacing the position of the original and to select the optimum read-out among those read at the plural positions, and the processing would be complicated in the case where the read information is shifted or rotated by controlling means of a personal computer, a word processer or the like.

SUMMARY OF THE INVENTION

An object of the invention is to provide an original reading apparatus which is capable of exactly and electro-optically reading a desired portion of an original with a very easy operation.

Another object of the invention is to provide an original reading apparatus that reads a desired portion of an original with the original being exactly laid and is capable of readily performing a positional correction of the original.

Still another object of the invention is to provide an original reading apparatus that is capable of arranging a desired portion of an original in an exact position for reading the same and is superior in operability even in case of a thick book and an original larger than an original platen.

According to the present invention, there is provided an original reading apparatus comprising an original platen for laying an original with a surface to be read thereof being directed upward; a reading region inputting means for assigning a reading region of the original from an upper side of the surface to be read of the original; and a reading means for electronically reading at least the reading region of the original with making distinction between the reading region and the other region of the original than the reading region in accordance with an output from said reading region inputting means, thereby converting the reading information into image information.

According to another aspect of the invention, in addition to the arrangement described above, there is provided an original reading apparatus comprising means for indicating reference coordinates relative to said reading means on the surface to be read of the original. A position of the original is finely adjusted on the basis of the reference coordinates, and its reading region is exactly positioned relative to the reading means.

According to still another aspect of the invention, in addition to the arrangement in conformity with the first aspect, there is provided an original reading apparatus comprising a carriage means for carrying the reading means and for moving the reading means above the surface to be read of the original. The reading region inputting means of this apparatus includes an ultrasonic type digitizer disposed in the vicinity of and above the original.

It is preferable that the reading means and the carriage means be arranged rotatably on the upper side of the platen so as to be close to or away from the original platen.

The foregoing objects and features of the invention and other objects, features and advantages thereof will become more apparent by reading the following description and appended claims taken in conjunction with the accompanying drawings.

BRIEF DESCRIPTION OF THE DRAWINGS

In the accompanying drawings:

FIG. 1 is a perspective view of an original reading apparatus in accordance with a first embodiment of the invention;

FIG. 2a is a perspective view of an original reading apparatus in accordance with a second embodiment of the invention, and FIG. 2b is a schematic view showing an essential part of the apparatus shown in FIG. 2a;

FIG. 4b is an enlarged view showing a part indicated by "B" in FIG. 4a;

DESCRIPTION OF THE PREFERRED EMBODIMENTS

Figure 3:
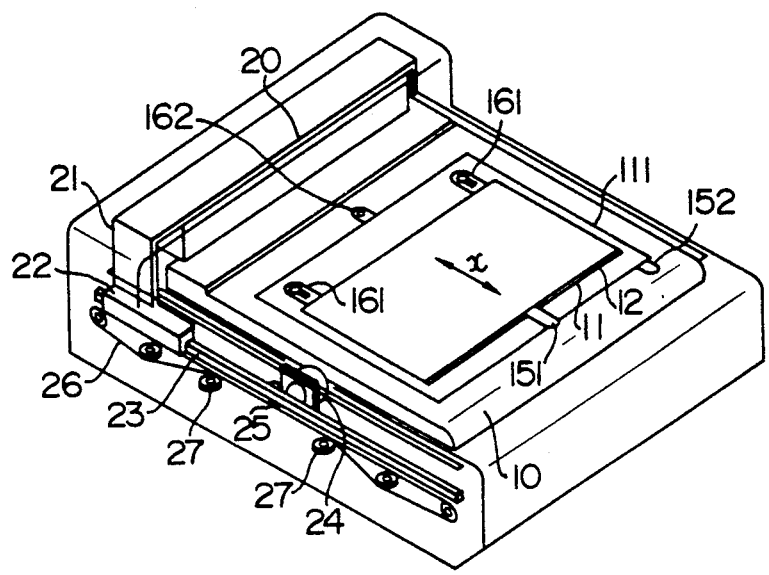
FIGS. 3 and 4a are perspective views showing modifications of the second embodiment of the invention, respectively.

The present invention will now be described with reference to the embodiments shown in the accompanying drawings.

Referring to FIG. 1, an original reading apparatus in accordance with a first embodiment has a box shaped base 5 on which a flat original platen 10 is mounted. The original reading apparatus further includes a bridge-like carriage 21 having a pair of legs at opposite ends thereof. The carriage 21 is arranged so as to extend over the original platen 10. The carriage 21 carries thereon an original reading sensor 20 so as to let the same face the original platen 10.

A guide rail 23 is mounted along one side of the base 5, and one of the legs of the carriage 21 is slidably supported to the guide rail 23 through a bearing 22. On the same side of the base, there are mounted a pulse motor 24, a wire drum 25 fixed to a shaft of the motor 24, a plurality of guide pulleys 27 and a wire 26 for connecting the bearing 22 and the wire drum 25 by the guidance of the guide pulleys. A like drive mechanism is also provided on the opposite side of the base 5, so that the carriage 21 together with the sensor 20 is moved over the original platen 10 in response to the operation of the pulse motor.

A pair of upper and lower original covers 12 and 11 are laid on the original platen 10. The original covers 12 and 11 are made of a thin transparent synthetic resin plate. An original is interposed between both the covers. A support member 16 is mounted at one corner of the original covers 12 and 11 which are mounted on the original platen 10 so as to be horizontally rotatable through the support member 16. Also, a fine adjustment knob 15 is formed at the diametrically opposite corner of the original covers 12 and 11 for manually adjusting an inclination and a position of the original.

In this embodiment of the invention, a digitizer 30 constituting an original reading region inputting means is incorporated in the original platen 10. The digitizer 30 is of an electromagnetic induction type, and is so constructed as to, when a coordinate input pen 31 is operated, detect a position of a tip of the input pen 31. In the case of the electromagnetic induction type digitizer, even if the distance between the input pen and the digitizer through the original covers 12, 11 and the original 1 is kept at several millimeters, it is possible to detect the coordinate with high accuracy.

In operation of the thus constructed original reading apparatus, the original 1 is inserted between the original covers 12, 11 with its surface to be read being directed upward. It is possible to directly view the contents of the original 1 from above through the original cover 12, and it is therefore possible to change the inclination of the original 1 by moving the fine adjustment knob 15 rightward or leftward as desired. Subsequently, when a region 2 of the original to be read out is assigned by the input pen 31, the assigning information or output is fed to a readout sensor controller (not shown) through the digitizer 30.

Thereafter, when a command signal of original readout is inputted into the readout sensor controller by operation of mode setting switches or the like (not shown), the controller feeds a control signal to the motors 24 and the reading sensors 20. On rotation of the motors 24, the wire drums 25 cause the wires 26 to be driven so that the bearings 22 connected to the wires 26 are moved along the guide rails 23. As a result, the reading sensor 20 fixed to the carriage 21 is smoothly moved in a direction of an arrow F or R in FIG. 1 while keeping a constant distance from the original cover 12.

When the reading sensor 20 passes over the reading region 2 of the original assigned by the input pen 31, this partially reading region is read out or picked up as the image information by the sensor in accordance with the partially reading information or command from the reading sensor controller. In this case, in general, it is a principle to output only the image information within the partially reading region since memory means of the system including the original reading apparatus has no room in capacity. However, there are cases that it is necessary to assign several regions for partial reading at the same time and it is necessary to use the image information of the assigned region and the image information of other region than the assigned region, respectively, in the system such as a personal computer or the like. Accordingly, the term "partial reading" referred to in the present specification is not limited only to the readout of the assigned region but is intended to mean to read out both the information within the assigned region and the information of other region than the assigned region and sort them for different processes.

The original cover 12 is not necessarily needed for the partial reading of the original, but is used for depressing creases thereof or folds of the original to prevent the damage of the original and the reading sensor 20 or the deformation of the readout information which may be otherwise caused by a possible catching of the reading sensor on the creases or folds during the movement of the sensor. Also, the means for inputting the coordinates is not limited to or by the input pen but may include any other means such as a cursor having an energized coil or the like.

As described above, according to the embodiment of the invention, it is possible to lay the original with its surface to be read being directed upward and assign the desired reading region thereof while directly viewing the original. Accordingly, it is possible to assign the portion of the original to be read with high accuracy. The reading region is not limited to that of a polygonal shape but it is possible to read out and assign the part of the original defined by a desired curve or complicated shape.

Next, an original reading apparatus according to a second embodiment of the invention will be described with reference to FIGS. 2a and 2b. In the embodiments of the invention which will be described hereinunder, component elements which may be like those of the first embodiment will be designated by the same reference numerals as used in FIG. 1 and explanation therefor will be omitted.

The original reading apparatus shown in FIG. 2a is different from that of the first embodiment of the invention only in that an original fixing plate 13 is provided further on the original cover 12, and is substantially the same as that of the first embodiment of the invention with respect to the other points. The original fixing plate 13 is made of a transparent synthetic resin and is pivoted to the original platen along one side thereof in order to prevent the horizontal position of the original fixing plate relative to the original platen 10 from being shifted and to be capable of removing the original covers 12, 11 or of covering these covers as shown in FIG. 2a. Also, lattice lines 18 showing reference coordinates for reading are depicted on the original fixing plate 13. The reference coordinates are determined in accordance with the maximum readable region of the reading sensor 20 and a direction in which the sensor can exactly read out the original. In this embodiment of the invention, although the lattice lines 18 are depicted on the original fixing plate 13, it is possible to alternatively use cross points indicating the intersections between the longitudinal lines and the lateral lines.

In operation of the original reading apparatus in accordance with the second embodiment of the invention, it is possible to more exactly adjust the position of the original 1 with reference to the lattice lines 18 for setting the position of the original without any inclination thereof relative to the reading sensor 20. The other operation is substantially the same as that of the first embodiment of the invention.

Incidentally, in the second embodiment of the invention, it is necessary to read only the contents of the original 1 with the reading sensor 20 and not to read out the indication of the lattice lines 18. In this embodiment, the lattice lines 18 are indicated in a transparent yellow. On the other hand, CCDs are used for the reading sensor and luminous diodes for green flush are used as the light source, so that sensor's sensitivity for the yellow color is reduced not to read the lattice lines 18. Alternatively, it is possible to use a liquid crystal panel for indicating the lattice lines or eliminating the lattice lines when not used.

Thus, according to the second embodiment of the invention, it is possible to confirm displacement or offset of the original relative to the reference coordinates of the lattice lines 18 and it is possible to correct the position of the original with accuracy. In particular, it is possible to exactly compensate the position of the original with ease, without moving the fixing plate 13, by operating the fine adjustment knob 15 of the original covers.

FIG. 3 shows a modification of the original reading apparatus according to the second embodiment of the invention. In this modification, a retainer sheet 111 made of a transparent synthetic resin for retaining the original covers 11, 12 is provided in addition to the structure of the second embodiment of the invention. The original covers 11, 12 are supported on the retainer sheet 111 through support members 161 to be movable in a direction indicated by an arrow x in FIG. 3. On the other hand, the retainer sheet 111 is mounted rotatably on the original platen 10 by means of a support member 162. Fine adjustment knobs 151 and 152 are formed on the original covers 11, 12 and the retainer sheet 111, respectively. In FIG. 3, there is not shown the original fixing plate 13, but the original fixing plate is provided on the original cover 12 in the same manner as in the second embodiment of the invention. In the modification, it is possible to carry out not only the correction of inclination of the original 1 but also the correction of the position thereof in the x direction, thereby further exactly arranging the original.

Figure 4B:
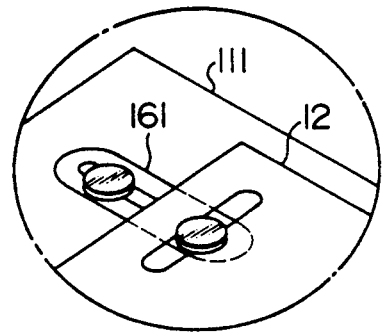
Figure 4A:
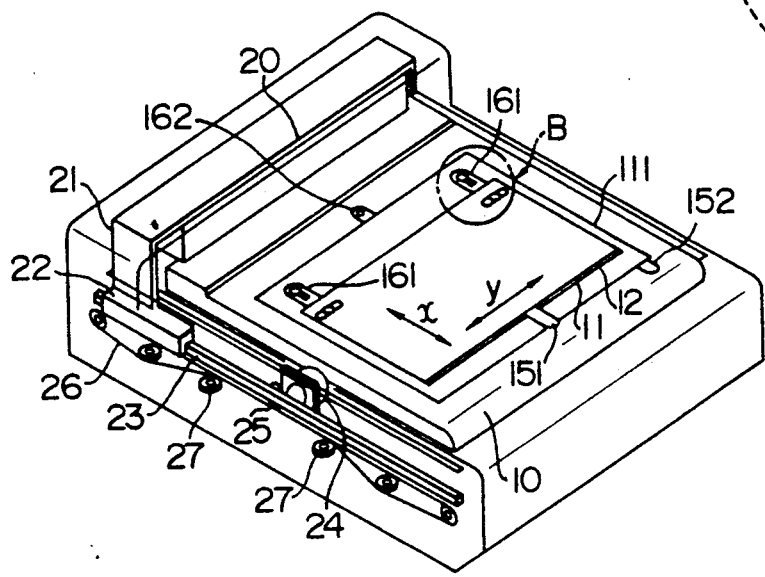

FIG. 4a shows an example of a further modification based upon the foregoing modification according to the invention. In this modification, as shown on an enlarged scale in FIG. 4b, the support members 161 are modified so that the original covers 11, 12 are movably supported in not only the direction x but also a direction y.

Figure 5:
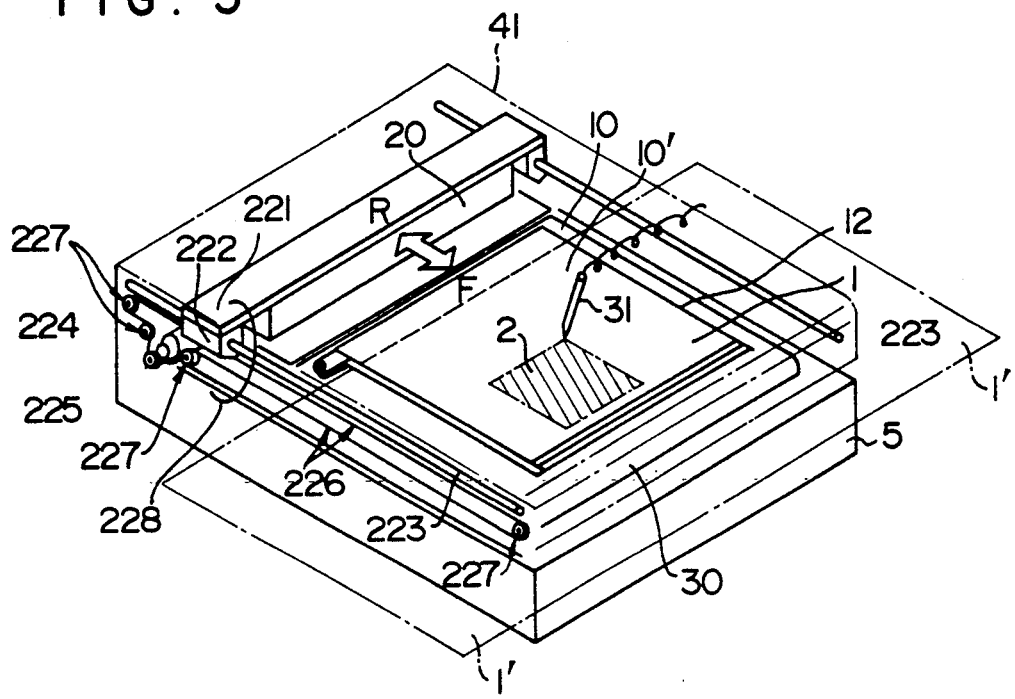
FIG. 5 is a perspective view of an original reading apparatus in accordance with a third embodiment of the invention.

Referring to FIG. 5, an original reading apparatus in accordance with a third embodiment of the invention has an upper cover 41 provided on the base 5. The upper cover 41 is pivotally mounted to the base 5 along one side thereof so as to be openable or closable as desired. A pair of guide rails 223, 223 are mounted within the upper cover 41 along longitudinal sides thereof. A carriage 221 is slidably mounted on the pair of rails through bearings 222, 222. Within the upper cover 41, there are further provided pulse motors 224 adjacent to respective guide rail 223, wire drums 225, wires 226 and a plurality of guide pulleys 227. In the same manner as in the foregoing embodiments of the invention, the operation of the pulse motors 224 causes the carriage 221 to be driven together with the reading sensor 20.

The most characterized feature of the foregoing structure is that the carriage mechanism 228 including the carriage 221, the bearings 222, the guide rails 223, the wires 226 and the like is located on the upper side of a reading surface 10' of the original platen 10 as well as the reading sensor 20.

Namely, with the structure, in the case where the size of the original 1 is very large as shown in FIG. 5, there is no hindrance in operation of the carriage mechanism 228 for moving the reading sensor 20 on the reading surface even if the original 1' is projected out of the reading surface 10'.

The operation of the original reading apparatus in accordance with this embodiment of the invention is substantially the same as that of the foregoing embodiments of the invention. After the partial reading region 2 of the original 1 is assigned by using the digitizer 30 and the input pen 31, the upper cover 41 is closed to start the reading operation of the apparatus. Then, the reading sensor 20 is moved within the upper cover 41 together with the carriage 221 to perform the partial reading of the original.

According to this embodiment of the invention, even if the size of the original exceeds the reading surface of the original platen, it is possible to lay a portion, to be read out, of the original on the original platen without folding or cutting the original.

In the foregoing embodiments of the invention, the digitizer 30 constituting the reading region inputting means is located below the original, but it is possible to arrange it on the upper side of the original. Namely, in case of a ultrasonic type digitizer, a transparent glass plate is used as a coordinates detecting plate, and a plurality of ultrasonic sensors are provided on the transparent glass plate at its end portions. Therefore, when the digitizer of this type is arranged on the surface of the original, it is possible to assign a readout region from above the original transparently through the digitizer. The embodiments of the invention shown in FIGS. 1 to 5 are rather suited for reading a sheet-like original. However, according to the upper side digitizer system, it is possible to read partially the original having a physical thickness such as a book or the like by applying to the apparatus a mechanism as shown in Japanese Patent Unexamined Publication No. 59-41963.

Figure 6:
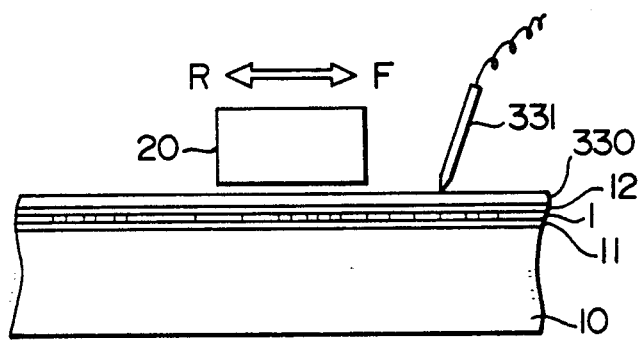
FIG. 6 is a schematic view showing an essential part of an original reading apparatus in accordance with a fourth embodiment of the invention.

FIG. 6 shows an essential part of an original reading apparatus according to a fourth embodiment of the invention, in which a digitizer is arranged on the upper side of an original. In this embodiment, the original 1 is fixed between the upper original cover 12 and the lower original cover 11 and further a ultrasonic type transparent digitizer 330 is provided on the upper side of the original. With the structure of this embodiment, it is possible to assign a partially reading region of the original with a coordinate input pen 331 or a cursor of the digitizer while transparently viewing the original through the digitizer 330 and the upper original cover 12 from above. In case of this embodiment, if such a modification is made that the original cover 12 is dispensed with and the original platen 10 is made of material having elasticity, it is possible to bring the original having a thickness such as a book into intimate contact with the digitizer 330 under a pressure from below. In this case, the digitizer 330 also serves as the original cover.

Incidentally, the other structure of the fourth embodiment of the invention is the same as that of the third embodiment of the invention shown in FIG. 5, but it is a matter of course that a similar carriage drive mechanism to that used in the first embodiment of the invention may be alternatively applied to the fourth embodiment of the invention. Also, in this fourth embodiment, it is possible to depict, on the digitizer 330, the lattice lines or points for the reference coordinates that are adopted in the original reading apparatus according to the second embodiment of the invention.

In the embodiment of the invention shown in FIG. 5, the original 1 cannot be projected from the original platen in the direction indicated by an arrow R. In view of this, in a fifth embodiment of the invention shown in FIG. 7, an opening/closing mechanism 440 for the upper cover 41 is provided in a spaced relationship from the reading surface 10' of the original platen in the direction indicated by the arrow R. With this arrangement, it is possible to project the original also in the direction indicated by the arrow R to further ensure the effect of the present invention.

In this case, particularly when the digitizer is arranged on the upper side of the original, all the operation for assigning the partial reading region of the original and for partially reading out the portion of the original in accordance with the information of the assignment is carried out by and under control of the mechanism which is located substantially on the upper side of the original platen. For this reason, it is possible to realize the reading operation with very high accuracy. Namely, a high accuracy is not necessarily needed for the opening/closing mechanism 40, and it is possible to reduce a cost for the overall original reading apparatus.

Figure 7:
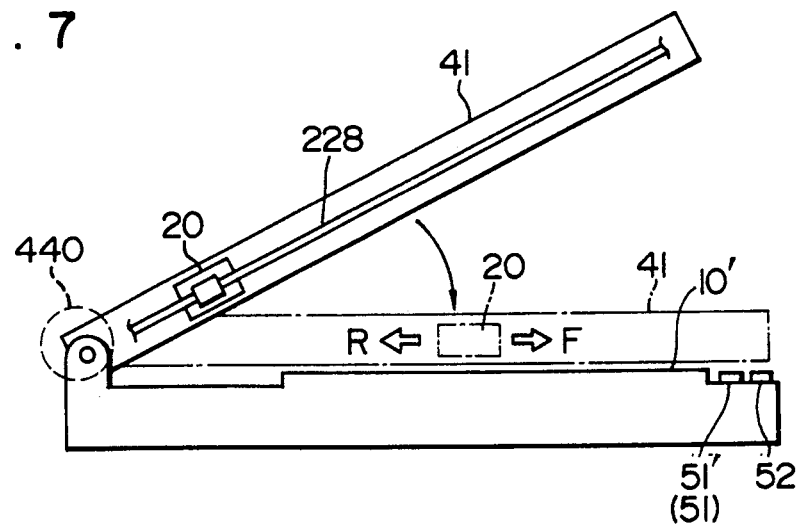
FIG. 7 is a schematic view showing an essential part of an original reading apparatus in accordance with a fifth embodiment of the invention.

However, in the case where the carriage mechanism and the reading sensor are disposed within the upper cover, there are some problems to be solved. Namely, when the original is laid in or removed from the original reading apparatus, it is general that such operation is carried out under the condition that the upper cover 41 including the reading sensor 20 and the carriage mechanism 228 is opened as shown in FIG. 7. In this case, if the carriage mechanism is operated for such a reason as malfunction and the reading sensor 20 is moved in the direction indicated by an arrow F in FIG. 7, a large force for closing the upper cover 41 downwardly is produced. If this force exceeds the upper limit of a retainer means (not shown) for retaining the upper cover 41 in the open state, the upper cover 41 would rapidly move downwardly to close to cause a very dangerous condition. Therefore, in order to prevent such an accident, it is necessary to provide a sensor fixing means 51 for fixing the operation of the carriage mechanism 228 in a mechanical manner or an electromagnetic manner by means of an electromagnetic means, in the case where the upper cover 41 is opened as shown in FIG. 7 and the regular reading operation is impossible to be made. More specifically, as shown in FIG. 7, an approach sensing switch 51' is provided on an upper end portion of the original platen, so that the switch 51' is kept open when the upper cover 41 is out of the regular operation condition, for instance, when the upper cover 41 is opened. In this condition, a drive signal or drive power for the drive section of the carriage mechanism 228 is disabled.

Also, when, in order to interchange originals or remove the original, the upper cover 41 is opened from the closed condition, there is a case where the reading sensor 20 is located in the midway of the upper cover 41 during the reading of the original. In this case, if the retaining means for the opening condition is not well operated, the upper cover 41 would be closed due to its weight to also cause a dangerous condition such that the fingers or hands of an operator would be clamped.

Such an accident may be avoided by providing an upper cover fixing means 52 for preventing the opening/closing mechanism 40 from being opened, when the reading sensor 20 and the carriage mechanism 228 are on a way of the operation and are at a position where they cause a dangerous condition if the upper cover is opened. More specifically, it is detected whether the carriage mechanism 228 is in a home position at the end portion of the opening/closing mechanism 40. If the carriage is in a position other than the home position, the upper cover 41 is locked from opening by means of a locking unit (not shown) using an electromagnetic effect.

As described above, according to the present invention, it is possible to provide an original reading apparatus which is very useful and convenient for partially and directly reading a portion to be read of an original from above, with good operability and high performance, and in which the surface to be read of the original is directed upwardly. Also, it is possible to read out a desired portion of the original containing desired information without any works, such as attaching a piece of blank paper onto the unnecessary part of the original, cutting out the necessary portion of a copied sheet by means of a cutters, setting the original in an unstable manner and viewing the original transparently from below by illuminating the same or the like, that are needed in the conventional apparatuses. Also, it is possible to process a plurality of assigned regions and to independently process the assigned region and non-assigned region by sorting them for different processes. It is further possible to lay the original of a large size exceeding the reading surface of the original platen with each and to position the original with high accuracy. As a result, it is possible to feed a necessary minimum information of the readout of the original into a personal computer or an engineering work station or the like to save the capacity of memory. It is possible to make the overall system light in weight and low in cost.

It will be appreciated that the present invention is not limited to the foregoing specific embodiments but various modifications are possible within the scope of the appended claims.

What is claimed is:

1. An original reading apparatus comprising:
   an original platen for laying thereon an original with a surface to be read thereof being directed upward;
   a reading region inputting means for assigning a reading region of the original from an upper side of the surface to be read thereof; and
   a reading means for electronically reading at least the reading region of the original while discriminating between the reading region and a region of the original other than the reading region in accordance with an output from said reading region inputting means and for converting the reading region into an image information, whereby an operator may directly observe the surface of the original to be read for confirmation from the upper side thereof so that the reading region is assigned and read out;
   wherein said reading region inputting means includes an electromagnetic induction type digitizer arranged on a lower side of and adjacent to the original, and an electromagnetic means for assigning coordinates of the reading region of the original to said digitizer from the upper side of the original.

2. The apparatus according to claim 1, wherein said digitizer is provided within said original platen.

3. An original reading apparatus comprising:
   an original platen for laying thereon an original with a surface to be read thereof being directed upward;
   a reading region inputting means for assigning a reading region of the original from an upper side of the surface to be read thereof; and
   a reading means for electronically reading at least the reading region of the original while discriminating between the reading region and a region of the original other than the reading region in accordance with an output from said reading region inputting means and for converting the reading region into an image information, whereby an operator may directly observe the surface of the original to be read for confirmation from the upper side thereof so that the reading region is assigned and read out;

wherein said reading region inputting means includes a supersonic type digitizer having a plate member disposed adjacent to the upper side of the original and a plurality of supersonic sensors provided on said plate member, and a supersonic wave generating means for assigning coordinates of the reading region of the original to said digitizer from the upper side of the original, said plate member serving to depress the original in a flat manner.

4. The apparatus according to claim 3, wherein said plate member is made of transparent material and is disposed on the upper side of the original, and reference coordinates for indicating a readable region of the reading means is indicated on said plate member.

5. An original reading apparatus comprising:

an original platen for laying thereon an original with a surface to be read thereof being directed upward;

a reading region inputting means for assigning a reading region of the original from an upper side of the reading surface of the original, said reading region inputting means being located adjacent to the original;

a reading means for electronically reading at least the reading region of the original while discriminating between the reading region and a region of the original other than the reading region in accordance with an output from said reading region inputting means and for converting the reading region into an image information;

means independent of said reading region inputting means and said reading means for indicating reference coordinates relative to said reading means onto the upper side of the surface of the original to be read, whereby an operator may directly observe the surface of the original to be read for confirmation on basis of said reference coordinates from the upper side of the surface to be read so that the reading region is assigned and read out; and original fine adjustment means for finely adjusting a position of the original on said optical platen on basis of the reference coordinates of said indicating means.

6. An original reading apparatus comprising:

an original platen for laying thereon an original with a surface thereof to be read being directed upward;

a reading region inputting means for assigning a reading region of the original from an upper side of the surface to be read of the original, said inputting means including an ultrasonic digitizer having a transparent plate disposed adjacent to the upper side of the original and a plurality of ultrasonic sensors provided on said transparent plate, and an ultrasonic wave generating means for assigning coordinates of reading region of the original to said digitizer from the upper side of the original;

a reading means for electronically reading at least the reading region of the original while discriminating between the reading region and a region of the original other than the reading region in accordance with an output from said reading region inputting means and for converting the reading region into an image information;

a carriage means for carrying said reading means and for moving said reading means over the reading surface of the original; and means for fixing said reading means by stopping an operation of said carriage means when said reading means and said carriage means are not in a regular operative condition;

wherein said reading means and said carriage means are received in an upper cover which is mounted on said original platen so as to be close to or away from said original plate.

7. An original reading apparatus comprising:

an original platen for laying thereon an original with a surface thereof to be read being directed upward;

a reading region inputting means for assigning a reading region of the original from an upper side of the surface to be read of the original, said inputting means including an ultrasonic digitizer having a transparent plate disposed adjacent to the upper side of the original and a plurality of ultrasonic sensors provided on said transparent plate, and an ultrasonic wave generating means for assigning coordinates of reading region of the original to said digitizer from the upper side of the original;

a reading means for electronically reading at least the reading region of the original while discriminating between the reading region and a region of the original other than the reading region in accordance with an output from said reading region inputting means and for converting the reading region into an image information;

a carriage means for carrying said reading means and for moving said reading means over the reading surface of the original; and an upper cover fixing means for preventing said upper cover from being opened when said reading means and said carriage means are on a way of the operation;

wherein said reading means and said carriage means are received in an upper cover which is mounted on said original platen so as to be close to or away from said original platen.

* * * * *